(12) United States Patent
Morral et al.

(10) Patent No.: US 11,167,492 B2
(45) Date of Patent: Nov. 9, 2021

(54) MOUNTING PRINT BUCKETS ON PRINTING STATIONS

(71) Applicant: HEWLETT-PACKARD DEVELOPMENT COMPANY, L.P., Houston, TX (US)

(72) Inventors: Pol Morral, Sant Cugat del Valles (ES); Fernando Juan, Viladecavalls (ES); Pau Martin Vidal, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 401 days.

(21) Appl. No.: 16/092,187

(22) PCT Filed: May 12, 2016

(86) PCT No.: PCT/EP2016/060770
§ 371 (c)(1),
(2) Date: Oct. 8, 2018

(87) PCT Pub. No.: WO2017/194142
PCT Pub. Date: Nov. 16, 2017

(65) Prior Publication Data
US 2019/0160750 A1   May 30, 2019

(51) Int. Cl.
*B29C 64/259* (2017.01)
*B33Y 30/00* (2015.01)
(Continued)

(52) U.S. Cl.
CPC ............ *B29C 64/259* (2017.08); *B22F 12/00* (2021.01); *B29C 64/20* (2017.08); *B29C 64/245* (2017.08);
(Continued)

(58) Field of Classification Search
CPC ..... B29C 64/20; B29C 64/245; B29C 64/259; B29C 64/321; B33Y 10/00; B33Y 30/00;
(Continued)

(56) References Cited

U.S. PATENT DOCUMENTS

| 4,530,611 A | 7/1985 | Borcenk et al. |
| 6,554,600 B1 | 4/2003 | Hofmann |

(Continued)

FOREIGN PATENT DOCUMENTS

| CN | 102963001 A | 3/2013 |
| CN | 204367427 | 6/2015 |

(Continued)

OTHER PUBLICATIONS

"3Dprinter Workbench Trolley—3DP Workbench," 3D Printing Articles, Mar. 13, 2016, 5 pages, 3Dfilamenta,com/blog.
International Search Report and Written Opinion for International Publication No. PCT/EP2016/060770 dated Feb. 13, 2017, 13 pages.

*Primary Examiner* — Robert J Grun
(74) *Attorney, Agent, or Firm* — HP Inc. Patent Department

(57) ABSTRACT

A build platform (100, 200, 300) for a printing station is described comprising a trolley (105, 205, 305, 405) and a print bucket (110, 210, 310, 410). The print bucket may be mounted on the trolley and may comprise coupling elements (115A, 115B, 215A, 215B, 315A, 315B, 415A, 415B), respectively engageable to receiving elements (120A, 120B, 220A, 220B, 320A, 320B, 420A, 420B) of the printing station (150, 250, 350, 450). The coupling elements may cause the print bucket to at least partially disengage from the trolley when the coupling elements engage with the receiving elements of the printing station.

19 Claims, 6 Drawing Sheets

(51) Int. Cl.
*B33Y 40/00* (2020.01)
*B29C 64/245* (2017.01)
*B29C 64/321* (2017.01)
*B29C 64/20* (2017.01)
*B33Y 10/00* (2015.01)
*B22F 12/00* (2021.01)
*B22F 10/10* (2021.01)

(52) U.S. Cl.
CPC ............ *B29C 64/321* (2017.08); *B33Y 10/00* (2014.12); *B33Y 30/00* (2014.12); *B33Y 40/00* (2014.12); *B22F 10/10* (2021.01); *Y02P 10/25* (2015.11)

(58) Field of Classification Search
CPC .......... B33Y 40/00; B22F 10/10; B22F 10/20; B22F 12/00; Y02P 10/25
See application file for complete search history.

(56) References Cited

U.S. PATENT DOCUMENTS

| | | |
|---|---|---|
| 7,033,160 B2 | 5/2006 | Fong |
| 8,220,613 B2 | 7/2012 | Dehne et al. |
| 2013/0052291 A1 | 2/2013 | Morikawa |

FOREIGN PATENT DOCUMENTS

| | | |
|---|---|---|
| CN | 204471682 | 7/2015 |
| CN | 105328907 | 2/2016 |
| CN | 105666875 A | 6/2016 |
| DE | 102004057865 | 6/2006 |
| DE | 102009029765 | 12/2010 |
| FR | 3013022 | 5/2015 |
| WO | WO-2015-091941 | 6/2015 |
| WO | WO-2015100086 | 7/2015 |
| WO | WO-2015108545 | 7/2015 |

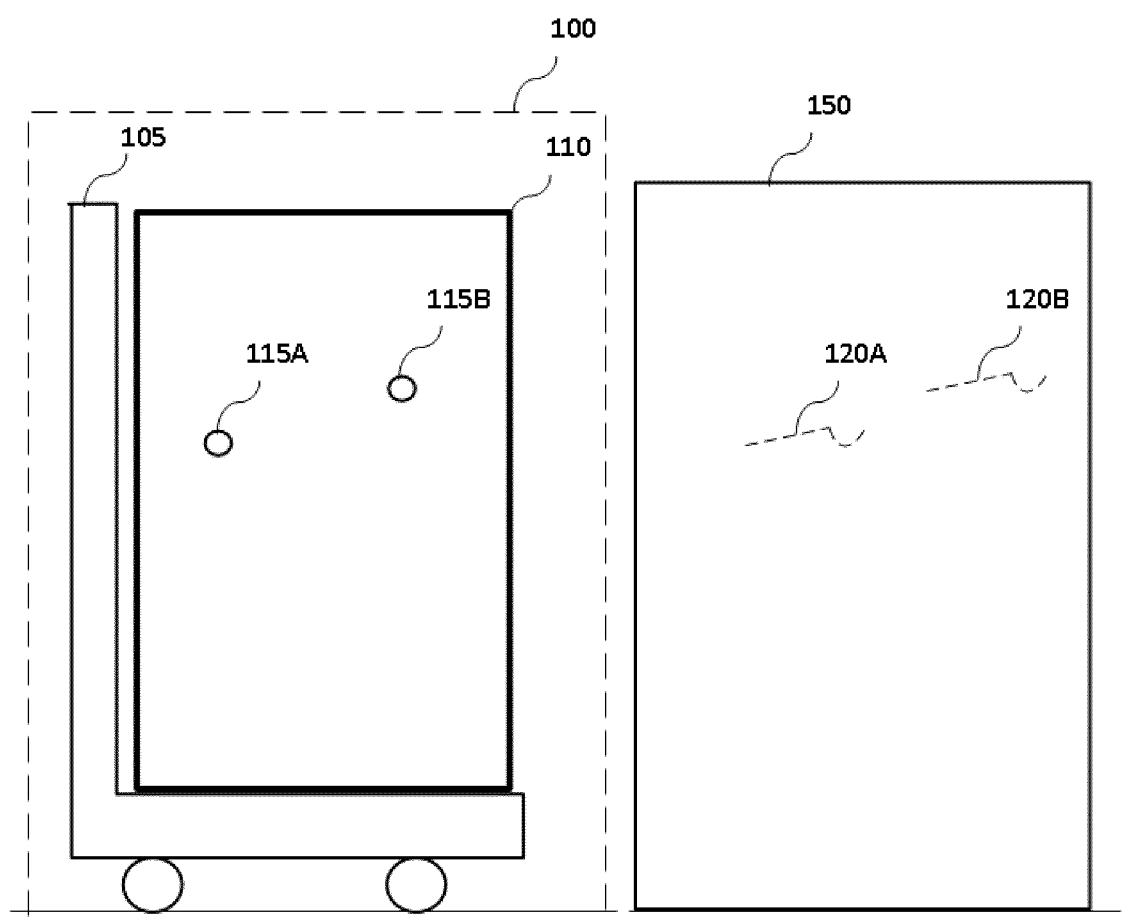

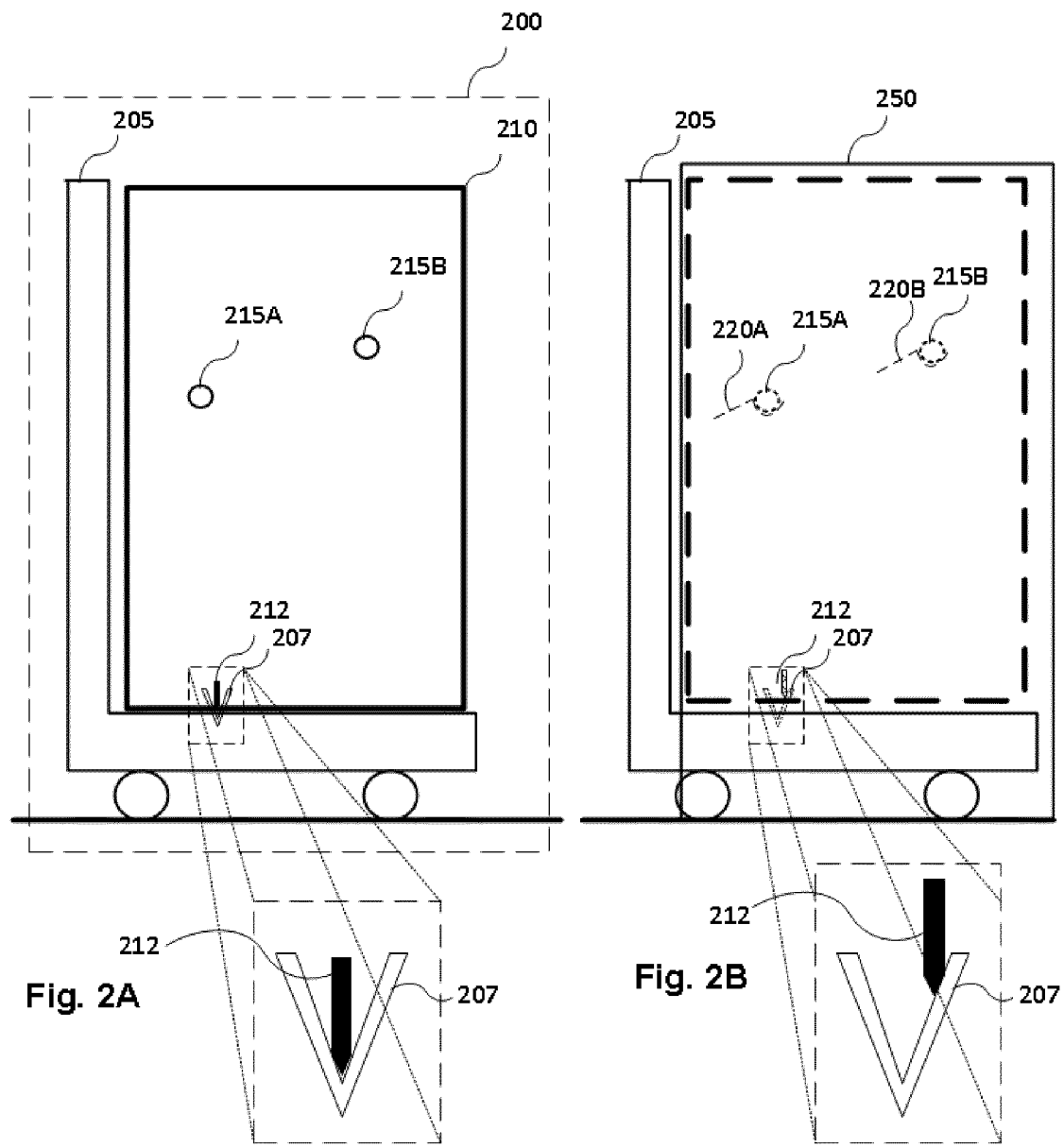

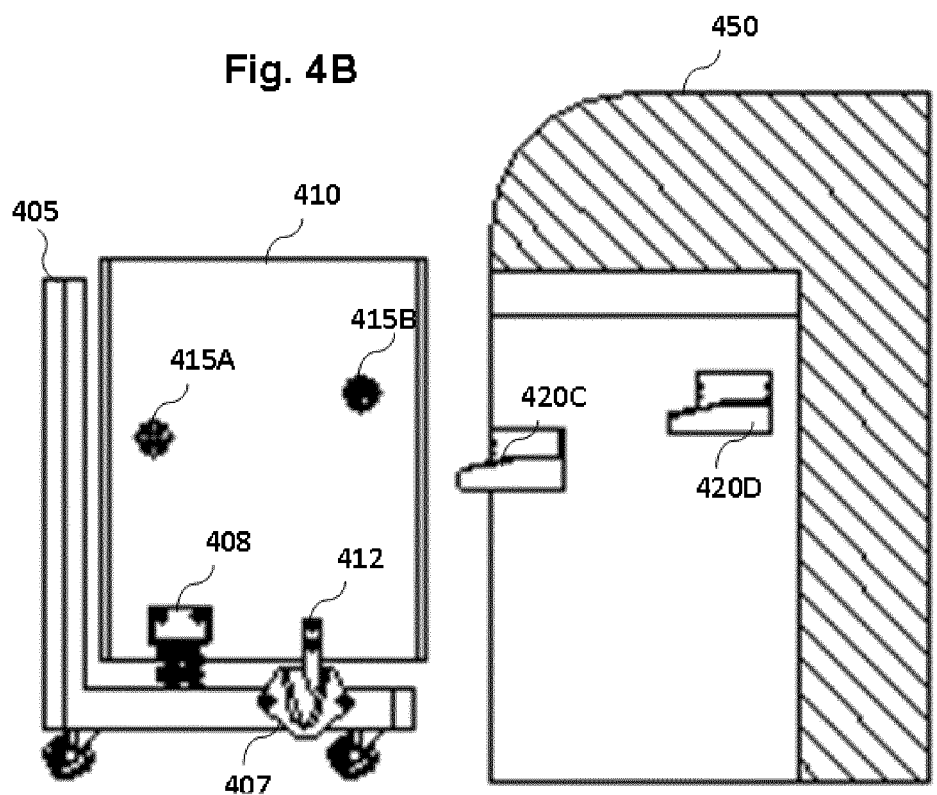
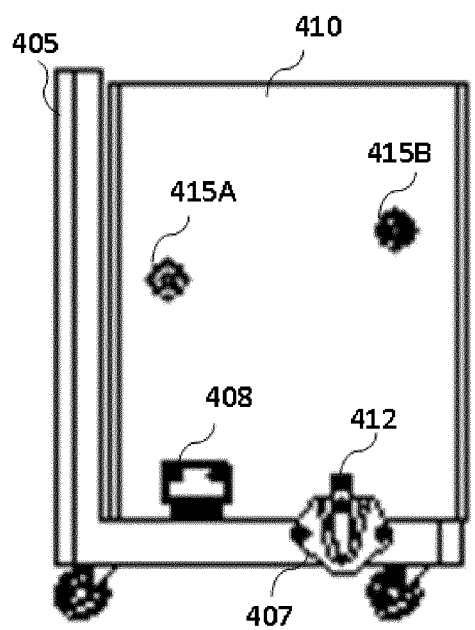

US 11,167,492 B2

MOUNTING PRINT BUCKETS ON PRINTING STATIONS

BACKGROUND

Most digital printing technologies are component based. For example, some inkjet printing technologies use print liquid cartridges, some laser printing technologies use toner cartridges and some powder-processing 3D printing technologies use build modules that may be inserted to a printing station or a build material management system.

Some printing technologies go through a drying or cooling process after the printing procedure.

BRIEF DESCRIPTION

Some non-limiting examples of the present disclosure will be described in the following with reference to the appended drawings, in which:

FIG. 1A is a schematic diagram illustrating an example of a build platform for a printing station according to implementations disclosed herein;

FIG. 1B is a schematic diagram illustrating an example of a printing station for receiving the print unit device of FIG. 1A;

FIG. 2A is a schematic diagram illustrating an example of a build platform having a print bucket partially engaged to a trolley according to implementations disclosed herein;

FIG. 2B is a schematic diagram illustrating an example printing system according to implementations disclosed herein, where a print bucket is partially disengaged from a trolley when inserted in a printing station;

FIG. 4B is a side view of a printing system according example implementations disclosed herein; and FIG. 4C is a side view of the print unit device 410 of FIG. 4B in a resting position on the trolley 405.

DETAILED DESCRIPTION

Figure 1C:
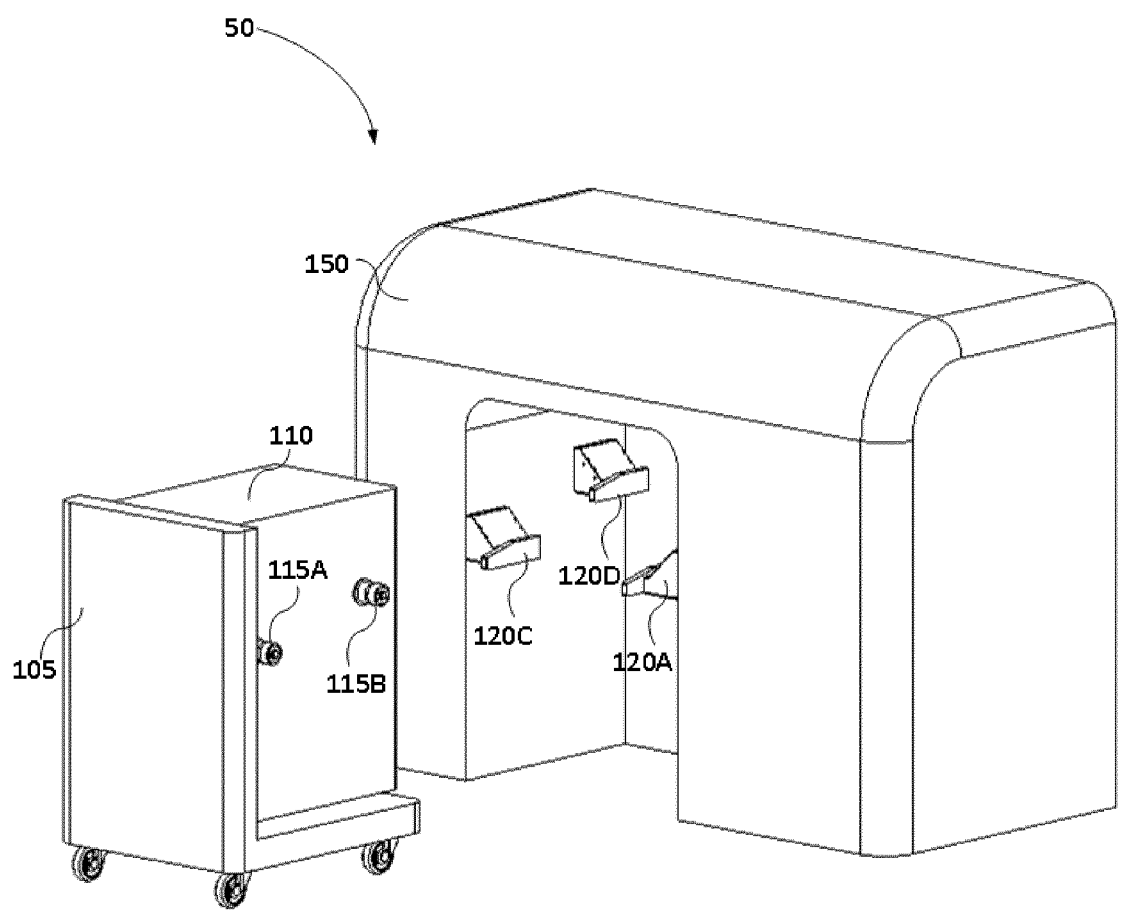
FIG. 1C is a schematic diagram illustrating an example of a printing system according to implementations disclosed herein.

Allowing this drying or cooling to take place outside the machine may free the printing station and allow another print job to start, thus increasing the whole printing process output and shortening cycle times.

To let the cooling to take place outside of the machine, a wheeled moving device, such as a wheeled moving device or a trolley, carrying the printed product may be used. For example, in powder-based 3D printing technologies the printed product is generated within a build chamber comprising layers of powder formed on a build platform. Thereafter, the contents of the build chamber may need to cool down before the printed product may be removed from the build chamber so that a new printing job may start. However, instead of removing the printed product, the entire build platform carrying the printed product may be removed so that another build platform may be inserted in the printing station to start a new print job while the printed product of the previous print job is cooling on its powder bed. The build platform may have a trolley so that it may be inserted in and removed from the printing station.

Once inside the printing station, the build platform may need to be placed at the right position with precision to assure proper alignment and accuracy between the powder bed and the printing station. Sometimes, the floor under the moving build platform and the printing station itself may not have a flatness and levelness to allow for proper alignment. In such cases, a way to get independency from the anomalous ground may need to be introduced.

In an example a build platform for a printing station is disclosed. The build platform may comprise a trolley and a print bucket. The print bucket may be mounted on the trolley and may comprise coupling elements. The coupling elements may be respectively engageable to receiving elements of the printing station. Such engagement may be gradual in the sense that the receiving elements may guide the coupling elements upwards, towards a coupling position when a user pushes the trolley inside the printing station. The coupling elements may cause the print bucket to disengage from the trolley when the coupling elements engage with the receiving elements of the printing station.

FIG. 1A is a schematic diagram illustrating an example of a build platform for a printing station according to implementations disclosed herein. FIG. 1B is a schematic diagram illustrating an example of a portion of a printing station for receiving the build platform of FIG. 1A. The build platform 100 may comprise two separate parts, the trolley 105 that may always lay on the ground and the print bucket 110 that may lay on the trolley 105 when the build platform 100 is outside of the printing station 150 but will rise to lay on the printing station 150 when the build platform 100 is inside the printing station 150. The print bucket 110 is shown mounted on the trolley 105 in FIG. 1A. The print bucket 110 may comprise a parallelepiped form and may comprise four coupling elements; two may be arranged on a first side while the other two may be arranged on a second side, parallel to the first. FIG. 1A shows one side of the build platform 100. The print bucket 110 may comprise coupling elements 115A and 115B on the one side. The coupling elements 115A and 115B may, in one example, be bearings. The build platform 100 may be part of printing system 50 shown in FIG. 2. The printing system 50 may also comprise printing station 150. FIG. 1B is a side view of printing station 150. Printing station 150 may have an aperture, e.g. a C-shaped aperture, to receive the build platform 100. The combination of the build platform 100 and printing station 150 may form a printing system. The printing station 150 and the print bucket 110 may perform a printing job or operation when engaged. For that purpose, the printing station may have receiving elements 120A and 120B. The receiving elements 120A and 120B may correspond to the coupling elements 115A and 115B, respectively, when the print bucket 110 is engaged with the printing station 150. It is understood that the printing station may further comprise another pair of receiving elements to engage with the coupling elements of the other side of the print bucket. The receiving elements 120A and 120B may also allow the print bucket to get at least partially disengaged from the trolley 105. Such disengagement may not depend on any external energy source but that of a user inserting and removing the build platform 100 to the printing station 150. The receiving elements 120A and 120B of the example of FIG. 1B may comprise a ramp and a pocket. In other implementations the receiving elements of the printing station 150 may comprise bearings and the coupling elements of the print bucket 110 may comprise ramps and pockets. To facilitate the engagement of the print bucket 100 with the printing station 150, other components may also be used instead of ramps, such as pivoting or lever elements. When a user pushes the trolley, the trolley 105 carries the print bucket inside the printing station and the bearings 115A and 115B may engage with the ramp of the receiving elements 120A and 120B respectively. The ramps may be inclined so that the bearings 115A and 115B may follow an upwardly route before they reach the respective pockets of the receiving elements 120A and 120B. The user's pushing force may then be converted to a raising force due to the effect of the ramp's slopes. Such upward direction of the bearings may cause the print bucket 110 to disengage from the trolley 100 and rise. Such disengagement may be gradual. The print bucket may gradually rise from the trolley, thus disengaging in a vertical direction but remain engaged in a horizontal direction. This may facilitate extraction of the print bucket when the user is pulling the trolley from the printing station. At first, while the bearings 115A and 115B are rolling on the respective ramps, the bottom of the print bucket 110 may disengage from the trolley. However, the back side of the print bucket 110, the side facing the vertical side of the trolley, may still be engaged with the vertical side of the trolley. When the bearings 115A and 115B reach the pockets of the receiving elements 120A and 120B, then the print bucket 110 may find a new resting place, and at least partially disengage from the trolley. The print bucket 110 may then be referenced against and aligned with the printing station 150 irrespective of any abnormalities of the ground on which the trolley remains.

FIG. 1C is a schematic diagram illustrating an example of a printing system according to implementations disclosed herein. The printing system 50 comprises a printing station 150 and a build platform having a trolley 105 and a print bucket 110. The print bucket 110 may have four bearings. Two coupling elements in the form of bearings (115A and 115B) are shown in FIG. 1C. Accordingly, the printing station 150 may have four receiving elements. Three receiving elements (120A, 120C and 120D) are shown in FIG. 1C in the form of ramp and pocket. The printing system 50 may be based on a powder-based 3D printing technology. The printing system 50 may comprise a printing mode and a resting mode. During the printing mode the print bucket 110 may be mounted on the printing station 150. This implies that the print bucket may be aligned with the printing station and a print job may be performed. The print bucket may comprise a build platform, e.g. at an upper side of the print bucket 110, where powder may be deposited to generate the printed product. The print bucket may further comprise a storage area for the powder. The printing station 150 may further comprise printing elements such as a powder levelling element, such as a roller or a blade, a powder agent deposition system and a powder melting heating element that may be operable during the printing mode. The printed product may rest on the powder bed to cool while another print job is performed using another build platform. For that purpose, the print bucket 110 may be removed (unmounted) from the printing station before the printed product is removed from the powder bed to free up resources, i.e. to allow for a next print job to begin before the printed product is cool enough to be removed from the powder bed. This helps maximise throughput of the printing system 150. While the printed product is cooling the printing system may be considered in a resting mode while the print bucket 110 is resting on the trolley 105 and until another build platform is inserted to commence a new print job or until the product is cool enough to be removed so that the same build platform may be reintroduced in the printing station for a next print job.

FIG. 2A is a schematic diagram illustrating an example of a build platform having a print bucket partially engaged to a trolley according to implementations disclosed herein. FIG. 2B is a schematic diagram illustrating an example printing system according to implementations disclosed herein, where a print bucket may be partially disengaged from a trolley when inserted in a printing station. In this example, the print bucket 210 may not disengage fully from the trolley 205 when the build platform is inserted in the printing station. The print bucket 210 may have a mounting element, such as protrusion element 212 on the side and the trolley 205 may have a partial arrestor, such as V-shaped port 207 corresponding to the protrusion element 212 when the print bucket is mounted on the trolley, as shown in FIG. 2A. Other than that, the build platform 200 may be similar to the build platform 100. When the coupling elements 215A and 215B engage with the ramps of the receiving elements 220A and 220B, the print bucket 210 may begin to rise from the trolley 205. The protrusion element 212 may then begin to slide on one of the inner slopes of the V-shaped port 207. This allows the print bucket 210 to disengage from the trolley to the extent that is no longer referenced with the ground to allow for referencing of the print bucket 210 with the printing station 250. However, the print bucket 210 may not completely disengage from the trolley 205, as shown in FIG. 2B. Therefore, when a print job is completed and the build platform 200 is to be removed, the print bucket 210 may easily return to its trolley position. The user may pull the trolley handle and the coupling elements 215A and 215B may then disengage from the pockets of the receiving elements 220A and 220B and begin to slide along the ramp. At the same time, the protrusion element 212 may slide in the V-shaped port 207 until it reaches the bottom. The V-shape of the port may force the print bucket 210 to always rest at the same position against the trolley 205 when the build platform 200 is disengaged from the printing station 250. The print bucket 210 may then be considered disengaged from the printing station 250 and the trolley may carry the print bucket 210 outside of the printing station so that the printed product may cool and allow for another build platform to be inserted in the printing station 250. As already mentioned for the coupling and the receiving elements, the print bucket 210 may comprise more than one mounting elements, e.g. two mounting elements, one at each lateral side of the print bucket. Accordingly, the trolley may comprise more than one, e.g. two partial arrestors, one at each side of the trolley.

Figure 3A:
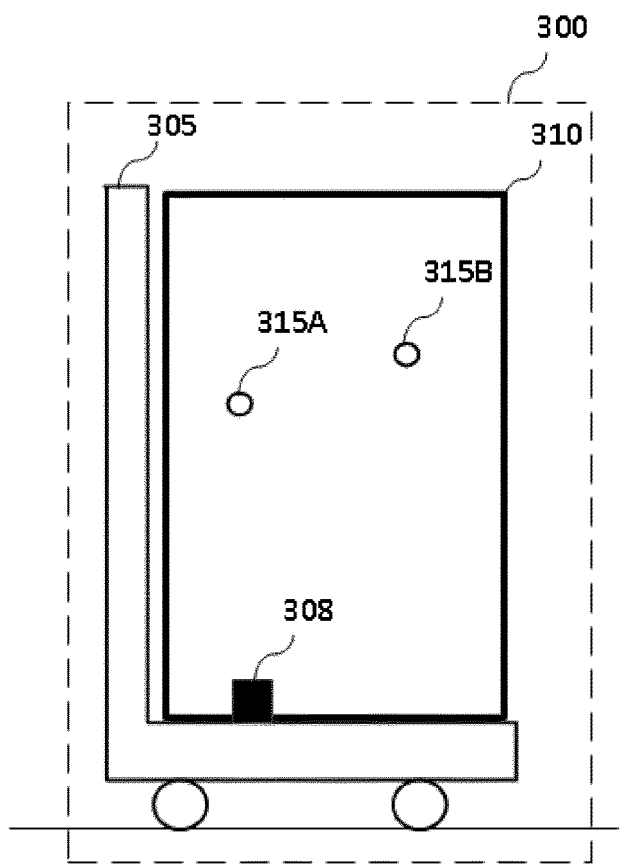
FIG. 3A is a schematic diagram illustrating an example of a build platform for a printing station with an elevation assisting mechanism in a contracted state.
Figure 3B:
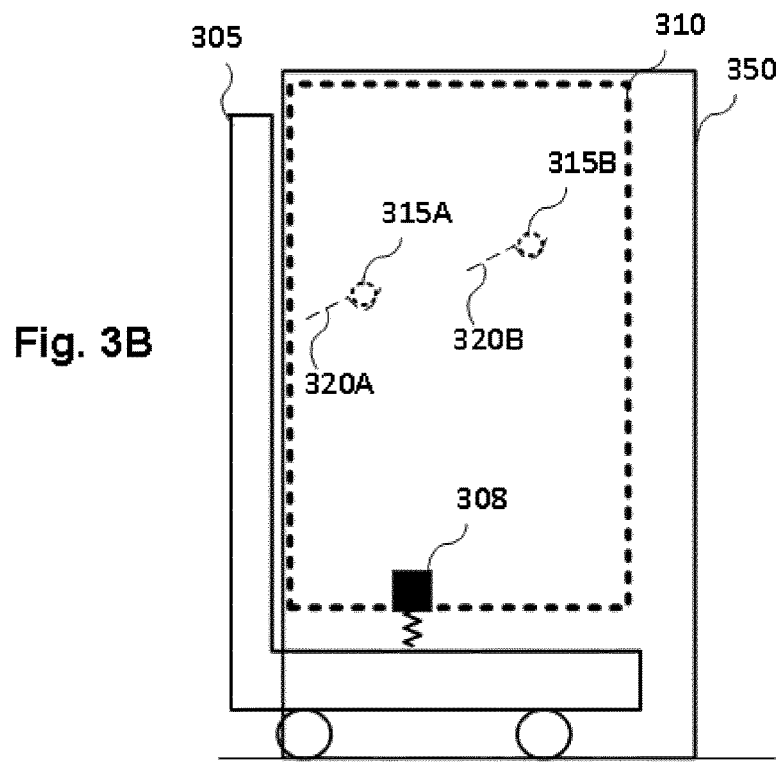
FIG. 3B illustrates a printing system according to implementations disclosed herein with the elevation assisting mechanism of the build platform in an expanded state.

FIG. 3A is a schematic diagram illustrating an example of a build platform for a printing station with an elevation assisting mechanism in a contracted state whereas FIG. 3B illustrates a printing system according to implementations disclosed herein with the elevation assisting mechanism of the build platform in an expanded state. In this example the trolley 305 may comprise an elevation assisting mechanism 308. This mechanism may be introduced to reduce the amount of force to be applied by the user when inserting the build platform to the printing station. In some implementations, the elevation assisting mechanism 308 may comprise a compressible mechanism, such as a spring, either a coil spring or an air spring. FIG. 3A shows the elevation assisting mechanism 308 with a spring in a compressed state when the print bucket 310 is mounted on the trolley 305. During this state the compressible element stores energy that is to be released when the spring is decompressed. FIG. 3B shows the elevation assisting mechanism 308 with the spring in a decompressed state when the print bucket 310 is engaged with the printing station 350, whereby the coupling elements 315A and 315B of the print bucket 310 are engaged with the receiving elements 320A and 320B of the printing station. This mechanism may help the user each time the user pushes the trolley in the printing station. The compressible mechanism may be provided on one or more sides of the trolley. For example, the compressible mechanism may comprise one spring mechanism closer to the back side of the trolley where the user may experience the highest force when the print bucket begins to rise, or a number of spring elements distributed around the base of the trolley to allow smoother elevation and engagement of the coupling elements of the print bucket with the ramp of the receiving elements of the printing station.

Figure 4A:
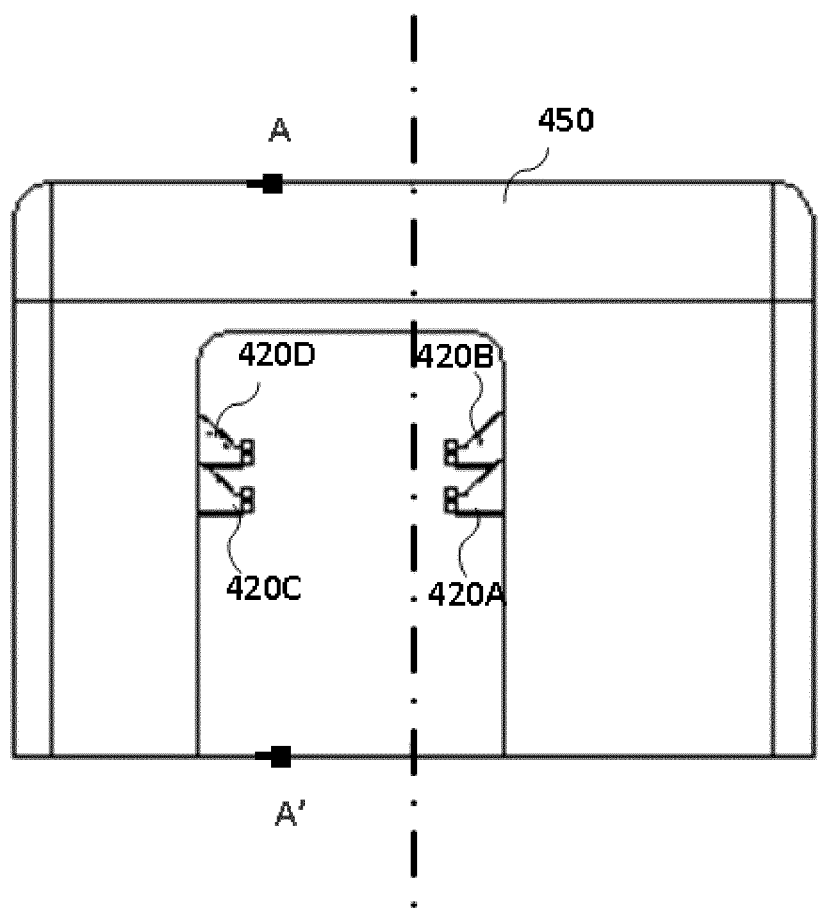
FIG. 4A is a front view of a schematic diagram of a printing station according to an example implementation.

FIG. 4A is a front view of a schematic diagram of a printing station according to an example implementation. The Printing station 450 may have an opening to receive a build platform. Inside the opening, at opposing walls of the opening, there may be four receiving elements 420A, 420B, 420C and 420D. Receiving elements 420A and 420B may be located at one internal wall of the station and receiving elements 420C and 420D at another internal wall of the station, opposite the other one. As may be seen in FIG. 4A, the receiving elements 420B and 420D may be positioned higher than the receiving elements 420A and 420C. Such arrangement may be implemented when the receiving elements 420B and 420D are positioned deeper into the opening compared to the receiving elements 420A and 420C. Thus, the coupling elements of the build platform corresponding to the receiving elements 420B and 420D may pass above the receiving elements 420A and 420C to reach their corresponding receiving elements. A section A-A is indicated in FIG. 4A.

FIG. 4B is a side view of a printing system according to example implementations disclosed herein. The printing system of FIG. 4B may comprise a build platform and a printing station. The printing station may correspond to the section A-A of the printing station of FIG. 4A. The build platform may comprise a trolley 405 and a print bucket 410. The print bucket 410 may comprise coupling elements 415A and 415B. Furthermore, the build platform may comprise an elevation assisting mechanism 408. The trolley may comprise a partial arrestor 407 and the print bucket may comprise a protruding element 412. The print bucket 410 in FIG. 4B is shown in an elevated position. It is understood that this may be the relative position between the print bucket and the trolley when the print bucket is mounted on the print station 420, for example during a printing mode. FIG. 4C shows the build platform 410 of FIG. 4B in a resting position on the trolley 405, for example during a resting mode. The print bucket 410 may assume this position when the build platform is outside of the printing station.

The example implementations discussed herein facilitate the insertion and extraction of build platforms in printing stations without requiring any mechanical or electronic actuators. Further to that, they provide a way of having several build platforms with print buckets having their own trolleys without each build platform having any complex or energy consuming equipment for mounting on the printing station.

Although a number of particular implementations and examples have been disclosed herein, further variants and modifications of the disclosed devices and methods are possible. For example, not all the features disclosed herein are included in all the implementations, and implementations comprising other combinations of the features described are also possible.

The invention claimed is:

1. A powder-processing 3D printing system, comprising a build platform and a printing station to receive the build platform,
    the printing station comprising powder processing elements and receiving elements, and
    the build platform comprising a trolley, a print bucket on the trolley, and coupling elements on the print bucket that each engage a respective receiving element of the printing station as the print bucket is pushed into the printing station on the trolley,
    wherein one of each respective coupling element or receiving element comprises a bearing and the other of each respective coupling element or receiving element comprises a ramp so that the print bucket is lifted off the trolley as the print bucket is pushed into the printing station on the trolley.

2. The system according to claim 1, wherein each of the ramps leads to a pocket.

3. The system according to claim 1, wherein the print bucket comprises a parallelepiped form and comprises four coupling elements, two arranged on a first side while the other two are arranged on a second side, parallel to the first.

4. The system according to claim 1, wherein the trolley comprises an elevation assisting mechanism.

5. The system according to claim 4, wherein the elevation assisting mechanism comprises a compressible mechanism to be compressed when the bucket is mounted on the trolley and decompressed when the print bucket is engaged with the printing station.

6. The system according to claim 5, wherein the compressible mechanism comprises a coil spring.

7. The system according to claim 5, wherein the compressible mechanism comprises an air spring.

8. The system according to claim 1, wherein the print bucket comprises a mounting element engageable with a partial arrestor of the trolley, the partial arrestor allowing upward movement of the mounting element when the coupling elements engage with the receiving elements.

9. The system according to claim 8, wherein the mounting element comprises a protruding element and the partial arrestor comprises a v-shaped port.

10. A powder-processing 3D printing system, comprising a printing station and a build platform,
    the build platform comprising a trolley and a print bucket,
        the print bucket having a top side to receive a powder, and the print bucket mounted on the trolley and comprising coupling elements, respectively engageable to receiving elements of the printing station,
    the printing station comprising powder processing elements and receiving elements to engage with respective coupling elements of the print bucket,
    wherein one or both respective coupling elements and receiving elements are configured to cause the print bucket to at least partially disengage from the trolley when the coupling elements engage with the receiving elements and the build platform is to receive the powder when coupling elements of the print bucket engage with receiving elements of the printing station and the print bucket at least partially disengages from the trolley, and wherein each of the respective coupling element or receiving element comprises a bearing, whereas each of the respective receiving or coupling element comprises a ramp.

11. The powder-processing 3D printing system of claim 10, the powder processing elements comprising a powder levelling element, a powder agent deposition system and a powder melting heating element.

12. The powder-processing 3D printing system of claim 10, the print bucket comprising a powder storage area.

13. The powder-processing 3D printing system of claim 10, wherein each ramp leads to a pocket.

14. The powder-processing 3D printing system of claim 10, wherein the print bucket comprises a parallelepiped form and comprises four coupling elements, two arranged on a first side while the other two are arranged on a second side, parallel to the first.

15. The powder-processing 3D printing system of claim 10, wherein the trolley comprises an elevation assisting mechanism.

16. The powder-processing 3D printing system of claim 10, wherein each receiving element of the printing station comprises a ramp leading to a socket, the ramp to guide the respective coupling element and the socket to engage with the coupling element.

17. The powder-processing 3D printing system of claim 10, comprising:
    a first wall comprising two receiving elements; and
    a second wall, opposite to the first wall, the second wall comprising another two receiving elements.

18. A portable build platform for a powder-processing 3D printing system that includes a printing station with powder processing elements, the build platform comprising:
    a trolley,
    a print bucket on the trolley, and
    a bearing and/or a ramp affixed to and protruding from each of two opposites sides of the print bucket, each of the bearings and/or ramps configured to engage a respective ramp and/or bearing in the printing station to lift the print bucket off the trolley as the print bucket is pushed into the printing station on the trolley.

19. The build platform of claim 18, wherein the bearing and/or ramp affixed to and protruding from each of two opposite sides of the print bucket comprises a bearing affixed to and protruding from each of two opposite sides of the print bucket, each of the bearings configured to engage a respective ramp in the printing station to lift the print bucket off the trolley as the print bucket is pushed into the printing station on the trolley.

* * * * *